US012307390B2

(12) United States Patent
Ota et al.

(10) Patent No.: US 12,307,390 B2
(45) Date of Patent: May 20, 2025

(54) VEHICLE MANAGEMENT SERVER, COMMUNICATION TERMINAL, AND VEHICLE MANAGEMENT PROGRAM

(71) Applicant: TOYOTA JIDOSHA KABUSHIKI KAISHA, Toyota (JP)

(72) Inventors: Shun Ota, Susono (JP); Taro Hasegawa, Toyota (JP); Tomoya Takeda, Toyota (JP); Yuka Nishiyama, Toyota (JP); Hiroya Chiba, Fuji (JP); Tatsuya Sugano, Sunto-gun (JP); Taizo Masuda, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/188,777

(22) Filed: Mar. 23, 2023

(65) Prior Publication Data

US 2023/0394379 A1  Dec. 7, 2023

(30) Foreign Application Priority Data

Jun. 2, 2022  (JP) .................................. 2022-090242

(51) Int. Cl.
*G06Q 10/02* (2012.01)
*G06Q 30/0645* (2023.01)
*G06Q 50/40* (2024.01)

(52) U.S. Cl.
CPC .......... *G06Q 10/02* (2013.01); *G06Q 30/0645* (2013.01); *G06Q 50/40* (2024.01)

(58) Field of Classification Search
CPC ........ G06Q 10/02; G06Q 50/40; G06Q 50/43; G06Q 50/47
See application file for complete search history.

(56) References Cited

U.S. PATENT DOCUMENTS

| | | | | |
|---|---|---|---|---|
| 11,460,310 | B1* | 10/2022 | Kelly | G08G 1/127 |
| 11,466,997 | B1* | 10/2022 | Williams | H04W 4/024 |
| 2016/0163138 | A1* | 6/2016 | Turner | G07C 9/00896 340/5.7 |
| 2018/0357737 | A1* | 12/2018 | Davis | H04L 67/56 |
| 2021/0107509 | A1* | 4/2021 | Hirose | B60R 21/00 |
| 2021/0201215 | A1* | 7/2021 | Tanabe | H04W 4/021 |

FOREIGN PATENT DOCUMENTS

| | | |
|---|---|---|
| JP | 2005-172777 A | 6/2005 |
| JP | 2014-079010 | 5/2014 |
| JP | 2020-166386 | 10/2020 |

OTHER PUBLICATIONS

Doll et al., "Private autonomous vehicles: The other side of the robo-taxi story," mckinsey.com, Dec. 1, 2020, Retrieved from https://www.mckinsey.com/industries/automotive-and-assembly/our-insights/private-autonomous-vehicles-the-other-side-of-the-robo-taxi-story (Year: 2020).*

* cited by examiner

*Primary Examiner* — Rupangini Singh
*Assistant Examiner* — Bryan J Kirk
(74) *Attorney, Agent, or Firm* — Oblon, McClelland, Maier & Neustadt, L.L.P.

(57) ABSTRACT

The vehicle management server manages a vehicle rented as a robot taxi from an owner to a user. The vehicle management server transmits the vehicle position information to a communication terminal of the owner when the vehicle is in operation as a robot taxi. The vehicle position information is a distance from the current position of the owner to the vehicle, or an area where the vehicle is currently located.

2 Claims, 4 Drawing Sheets

FIG. 3A

ROBOT TAXI ACTIVE SCREEN

ROBOT TAXI OPERATION STATUS: IN OPERATION
CURRENT POSITION OF VEHICLES: to 100KM

CAMERA  SETTING THE DESTINATION

* THE MAP IS NOT AVAILABLE BECAUSE IT IS CURRENTLY RUNNING AS A ROBOT TAXI.

FIG. 3B

SCREEN WHEN THE ROBOT TAXI IS NOT RUNNING

ROBOT TAXI OPERATION STATUS: WAITING FOR RESERVATION
CURRENT POSITION OF THE VEHICLE: SUSONO CITY

CAMERA  SETTING THE DESTINATION

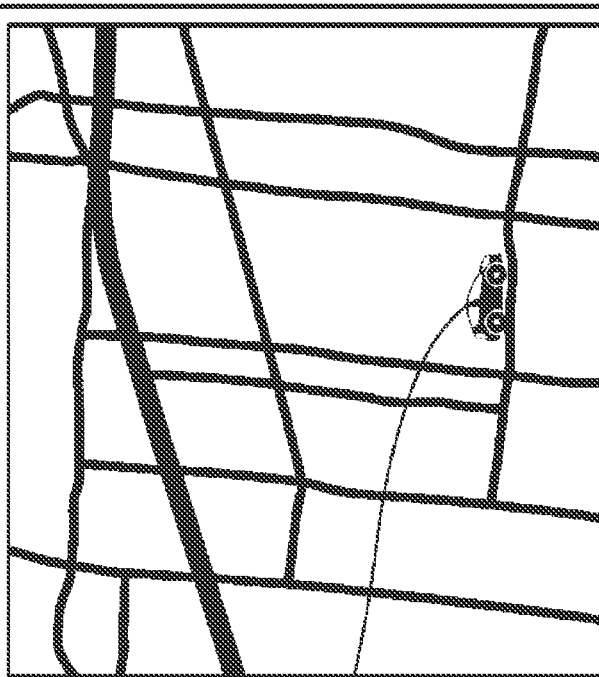

VEHICLE MANAGEMENT SERVER, COMMUNICATION TERMINAL, AND VEHICLE MANAGEMENT PROGRAM

CROSS-REFERENCE TO RELATED APPLICATION

This application claims priority to Japanese Patent Application No. 2022-090242 filed on Jun. 2, 2022, incorporated herein by reference in its entirety.

BACKGROUND

1. Technical Field

The present disclosure relates to a vehicle management server, a communication terminal, and a vehicle management program.

2. Description of Related Art

Japanese Unexamined Patent Application Publication No. 2005-172777 (JP 2005-172777 A) discloses a taxi fare guidance system. In this system, a taxi fee to a destination designated by a taxi user is displayed and guided in advance prior to the taxi use.

SUMMARY

JP 2005-172777 A does not propose the rental of a personal owned vehicle (POV) as a robot taxi. When the POV is rented as the robot taxi, it is considered that some owners want to confirm the state of their own vehicles being rented as the robot taxi. On the other hand, considering the privacy of the user of the robot taxi, it is not appropriate to provide all pieces of position information of the vehicles in operation as the robot taxi to the owner.

The present disclosure has been made in view of the above-described problems, and an object of the present disclosure is to satisfy a request of the owner who wants to confirm the state of the vehicle being rent while the privacy of the user of the robot taxi is considered.

A vehicle management server according to the present disclosure manages a vehicle rented from an owner to a user as a robot taxi. When the vehicle is in operation as the robot taxi, the vehicle management server transmits vehicle position information to a communication terminal of the owner. The vehicle position information is a distance from a current position of the owner to the vehicle or an area where the vehicle is currently positioned.

A communication terminal according to the present disclosure is operated by an owner of a vehicle rented to a user as a robot taxi. When the vehicle is in operation as the robot taxi, the communication terminal displays vehicle position information on the vehicle on a screen in a first display format, and when the vehicle is not in operation, the communication terminal displays the vehicle position information on the screen in a second display format different from the first display format.

A vehicle management program according to the present disclosure manages a vehicle rented from an owner to a user as a robot taxi. The vehicle management program is configured to cause a computer to execute a process of transmitting vehicle position information to a communication terminal of the owner when the vehicle is in operation as the robot taxi. The vehicle position information is a distance from a current position of the owner to the vehicle or an area where the vehicle is currently positioned.

A vehicle management method according to the present disclosure manages a vehicle rented from an owner to a user as a robot taxi. The vehicle management method includes transmitting vehicle position information to a communication terminal of the owner when the vehicle is in operation as the robot taxi. The vehicle position information is a distance from the current position of the owner to the vehicle or an area where the vehicle is currently positioned.

With the vehicle management server, the vehicle management program, and the vehicle management method according to the present disclosure, when the vehicle is in operation as the robot taxi, the distance from the current position of the owner to the vehicle or the area where the vehicle is currently positioned is transmitted to the communication terminal of the owner as the vehicle position information. The vehicle position information transmitted as described above is not accurate position information to the extent that the current position of the vehicle can be specified, and is approximate position information. For this reason, it is possible to satisfy the request of the owner who wants to confirm the state of the vehicle being rented while the privacy of the user of the robot taxi is considered.

Further, with the communication terminal according to the present disclosure, a display format of the vehicle position information on the screen of the communication terminal is changed between the first display format and the second display format different from each other depending on whether the vehicle is in operation as the robot taxi. With such a configuration, for example, it is possible to satisfy the request of the owner who wants to confirm the state of the vehicle being rented while the privacy of the user of the robot taxi is considered, when the vehicle position information in the first display format that is coarse as compared with that in the second display format is displayed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3A is a diagram illustrating an example of the screen of an owner terminal shown in FIG. 1;

FIG. 3B is a diagram showing another example of the screen of the owner-terminal shown in FIG. 1;

DETAILED DESCRIPTION OF EMBODIMENTS

Hereinafter, embodiments of the present disclosure will be described with reference to the accompanying drawings.

1. System Configuration

Figure 1:
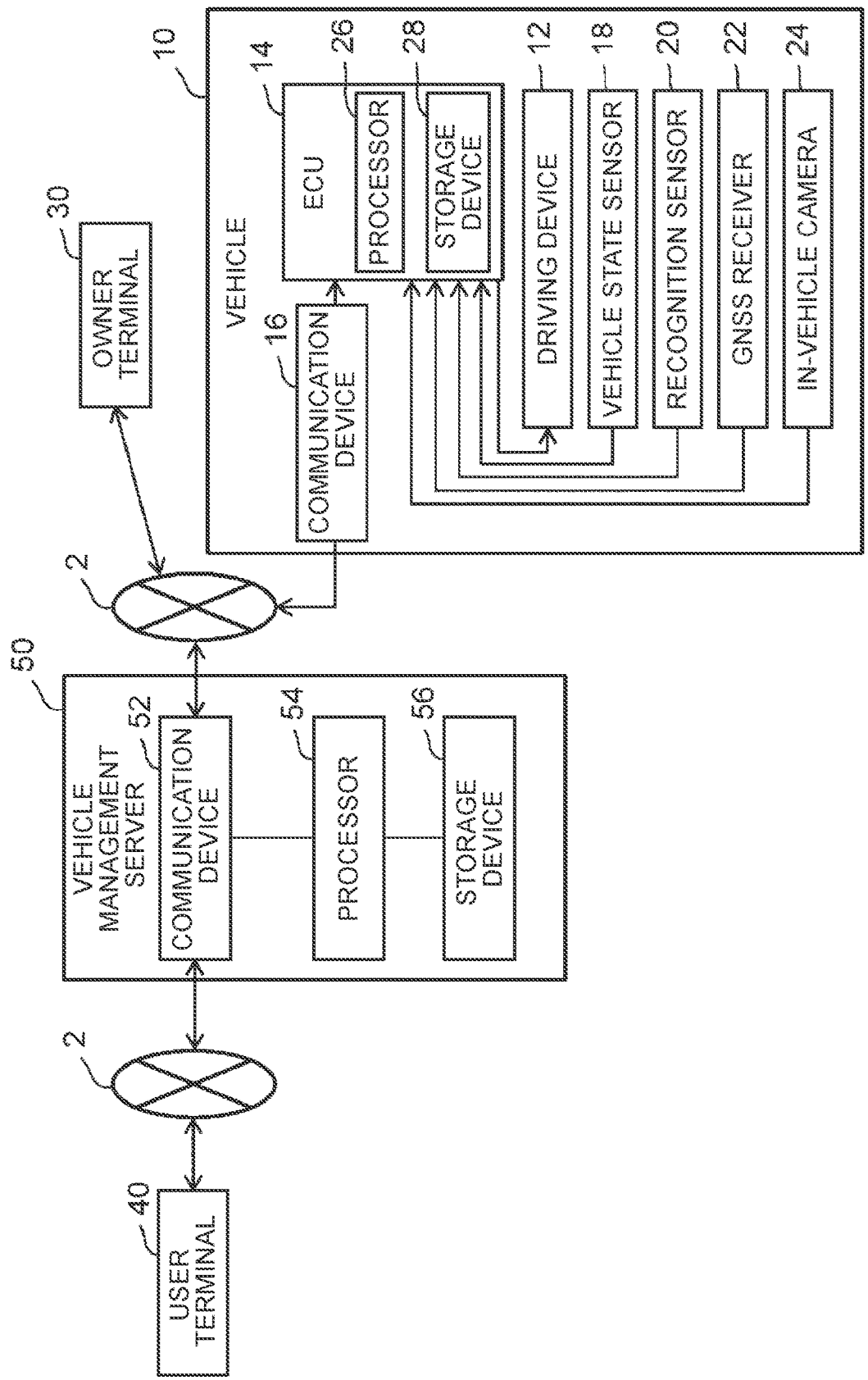
FIG. 1 is a diagram illustrating an example of a configuration of a vehicle management system according to an embodiment.

FIG. 1 is a diagram illustrating an example of a configuration of a vehicle management system according to an embodiment. The vehicle management system 1 illustrated in FIG. 1 manages a vehicle 10 rented as a robot taxi from an owner to a user. More specifically, the owner owns a vehicle 10, which is a personal owned vehicle (POV). Vehicle 10 is an autonomous vehicle capable of autonomous traveling at a level-4 or higher as defined by the American Automotive Engineering Association (SAE), and is configured to be operable as a robot taxi. Therefore, the owner can lend the vehicle 10 to a person as a robot taxi when the owner himself/herself is not using the vehicle 10.

The vehicle management system (hereinafter, also simply referred to as "system") 1 includes an owner's communication terminal (owner terminal) 30, a user terminal 40, and a vehicle management server 50 together with the vehicle 10.

The vehicle 10 includes a traveling device 12, an electronic control unit (ECU) 14, communication device 16, vehicle status sensor 18, recognition sensor 20, Global Navigation Satellite System (GNSS) receiver 22, and an in-vehicle camera 24.

The traveling device 12 includes, for example, a driving device, a braking device, and a steering device as devices that accelerate, decelerate, and steer the vehicle 10. ECU 14 is a computer that controls the vehicles 10. Specifically, ECU 14 includes a processor 26 and a storage device 28. The processor 26 executes various processes. The various processes include processes related to automatic driving control of the vehicle 10. The storage device 28 stores various types of information. Examples of the storage device 28 include volatile memory, non-volatile memory, Hard Disk Drive (HDD), and Solid State Drive (SSD). When ECU 14 (processor 26) executes various computer programs, various processes by ECU 14 are realized. The various programs are stored in the storage device 28 or recorded in a computer-readable recording medium. Note that a plurality of processors 26 and a plurality of storage devices 28 may be provided.

The communication device 16 communicates with each of the owner terminal 30, the user terminal 40, and the vehicle management server 50 via the communication network 2. The vehicle state sensor 18 detects a state of the vehicle 10. Examples of the vehicle state sensor 18 include a vehicle speed sensor, a steering angle sensor, a yaw rate sensor, and a lateral acceleration sensor. The recognition sensor 20 recognizes (detects) a situation around the vehicle 10. The recognition sensor 20 includes an outside camera that captures an image of the surroundings of the vehicle 10. GNSS receiver 22 obtains the position and orientation of the vehicles 10 based on the signals from GNSS satellites. The in-vehicle camera 24 captures an image of the interior of the vehicle 10.

While the vehicle 10 configured as described above is operating as a robot taxi, the vehicle can automatically travel to a destination by autonomous driving control of level 4 or higher.

The owner terminal 30 is operated by an owner of the vehicle 10. The owner terminal 30 is, for example, a smartphone or a tablet personal computer. The owner terminal includes a processor, a storage device, and a communication device. In addition, the owner terminal 30 can acquire the position of the owner who possesses the owner terminal 30 based on the signals from GNSS satellites.

The user terminal 40 is operated by a user borrowing the vehicle 10 from the owner. The user terminal 40 is, for example, a smartphone or a tablet personal computer. The user terminal 40 includes a processor, a storage device, and a communication device.

The vehicle management server (hereinafter, also simply referred to as "server") 50 is a computer that executes various kinds of processing in the system 1. The various kinds of processing include processing related to the mediation of the lease of the vehicle 10 between the owner and the user, and processing described later with reference to FIG. 2.

Specifically, the server 50 includes a communication device 52, a processor 54, and a storage device 56. The server 50 (communication device 52) is interposed between the owner terminal 30 and the user terminal 40 via the communication network 2, and communicates with the vehicle 10 via the communication network 2. The processor 54 executes the various processes described above. The storage device 56 stores various types of information. Examples of the storage device 56 include volatile memory, non-volatile memory, Hard Disk Drive (HDD), and Solid State Drive (SSD). When the processor 54 executes various computer programs, various kinds of processing by the processor 54 are realized. The various programs are stored in the storage device 56 or recorded in a computer-readable recording medium. Note that a plurality of processors 54 and a plurality of storage devices 56 may be provided.

2. Processing in the System

In the vehicle management system 1 of the present embodiment, the owner can access the server 50 and manage the vehicle 10 by operating the owner terminal 30 to execute a predetermined application. More specifically, when the vehicle 10 is rented (in other words, the vehicle 10 is sold as a robot taxi), the owner can accept the reservation of the vehicle 10 by the user registered in the application using the server 50. As described above, the owner and the user can rent and borrow the vehicle 10 by using the application provided in the system 1.

When the vehicle 10, which is a POV, operates as a robot taxi, if the owner can acquire the information of the vehicle in operation without limitation, there is a fear that the privacy of the user may be compromised. On the other hand, if the owner cannot acquire any information, the owner cannot grasp the state of the vehicle 10 and may feel anxious.

Therefore, in the vehicle management system 1, the following processing is executed in order to satisfy the request of the owner who wants to confirm the state of the vehicle 10 being lent while taking into consideration the privacy of the user of the robot taxi.

Figure 2:
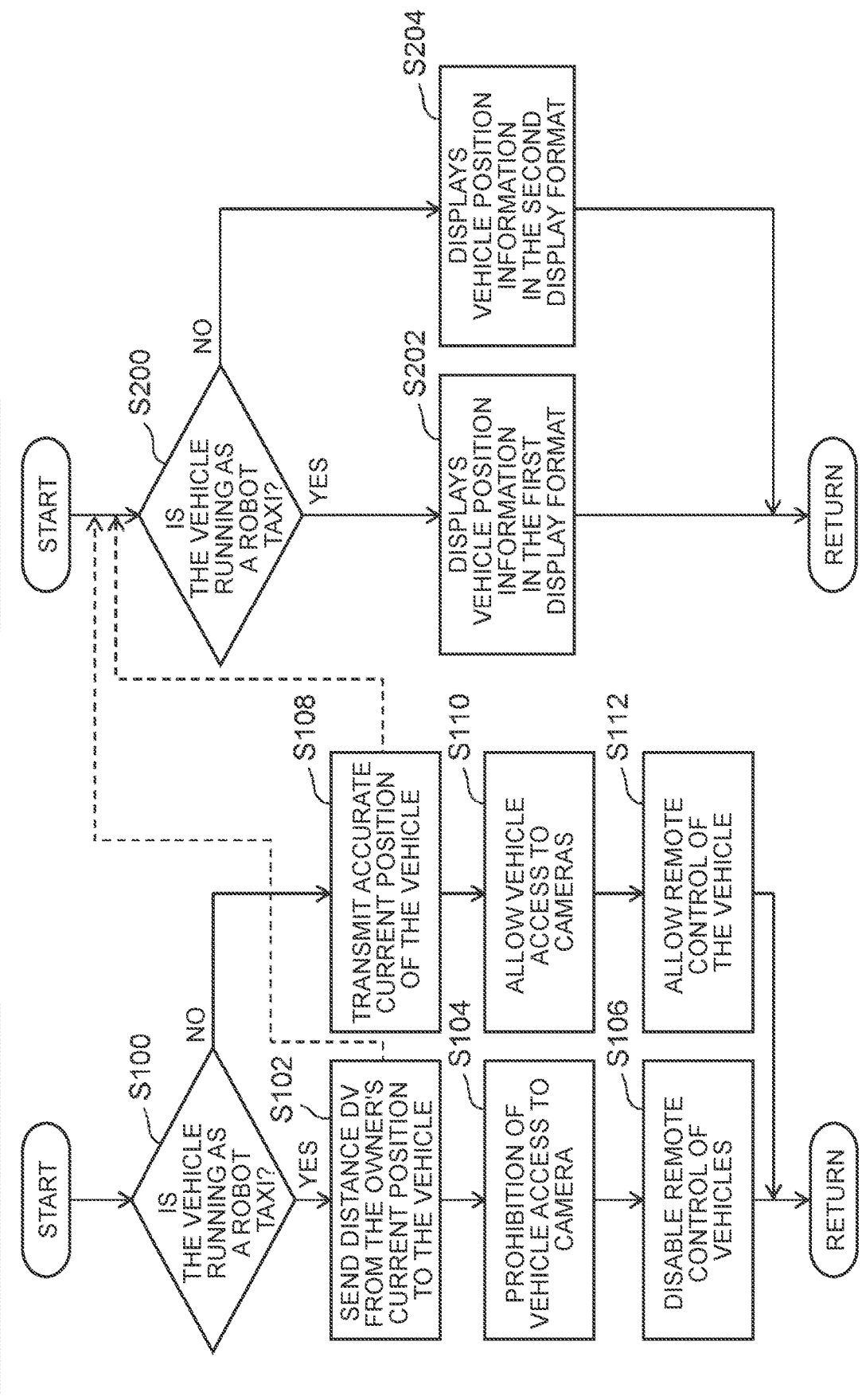
FIG. 2 is a flowchart illustrating an example of a process executed in the vehicle management system illustrated in FIG. 1.

FIG. 2 is a flowchart illustrating an example of a process executed in the vehicle management system 1 illustrated in FIG. 1. The process of this flowchart is started by the owner operating the owner terminal 30 to access the server 50, and is repeatedly executed until the access ends.

2-1. Processing of the Server

In the server 50, the process of the step S100~S112 is executed. In a S100 of steps, the server 50 (processor 54) determines whether or not the vehicle 10 is operating as a robot taxi.

Specifically, whether or not the vehicle is "in operation" is determined based on, for example, whether or not the vehicle is in the middle of a period from the departure time point T1 to the alighting time point T2. The departure time point T1 corresponds to the time point at which the vehicle 10 leaves the departure point P1 of the vehicle 10 when it is heading toward the user. When the vehicle 10 is headed by the user who initially rents the vehicle 10, the departure point P1 is, for example, a parking lot of the owner's home or a rental warehouse of the vehicle 10. Further, after lending to a certain user, the owner may travel around the vehicle 10 in order to lend the vehicle 10 to another user who wishes to rent the vehicle. In such cases, when the vehicle 10 is reserved by the other user, the present position of the vehicle 10 when going to the other user during the traveling travel corresponds to the departure point P1. The alighting time point T2 corresponds to a time point at which the user gets off the vehicle 10 as the lending of the vehicle 10 to the user ends.

Further, the determination as to whether or not it is "in operation" may be performed as follows. That is, the server 50 may determine that the vehicle is in operation, for example, after the vehicle 10 is separated from the departure point P1 by a first predetermined distance D1, rather than from the departure point P1. The first predetermined distance D1 is a predetermined distance for specifying a surrounding area of the departure point P1, and is, for example, a 500 m. The first predetermined distance D1 may be a linear distance from the departure point P1, or may be a distance (travel distance) along the travel route of the vehicle 10 from the departure point P1.

In addition, the period during which the vehicle 10 is traveling toward the user does not necessarily have to be included in "in operation".

When the vehicle 10 is operating as a robot taxi (step S100; Yes), in step S102, the server 50 calculates a distance Dv from the present position of the owner to the vehicle 10. The server 50 transmits the distance Dv as "vehicle position information" to the owner terminal 30.

In order to calculate the above-described distance Dv, the server 50 uses the current position of the owner transmitted from the owner terminal 30 (that is, the current position of the owner terminal 30). In order to calculate the distance Dv, the server 50 uses the present position of the vehicle 10 transmitted from the vehicle 10. The present position of the vehicle 10 is obtained by the vehicle 10 using GNSS receiver 22. Thus, the distance Dv calculated by the server 50 may be an accurate distance calculated using the present position of the vehicle 10 obtained using GNSS receiver 22. Alternatively, the distance Dv may be calculated as a rough distance compared to the precise distance calculated in this way, i.e. an approximate distance such as, for example, a 100 km order or a 10 km order (see, for example, FIG. 3A described below). The distance Dv may be a linear distance from the current position of the owner to the vehicle 10, or may be a distance (travel distance) along the travel route of the vehicle 10 from the current position of the owner.

Further, in the step S102, the server 50 may transmit, as the "vehicle distance information", the area Av in which the vehicle 10 is currently located to the owner terminal instead of transmitting the distance Dv. The area Av is information indicating an approximate present position of the vehicle 10, and is an area specified in administrative area units such as "city", "town", or "village", for example.

Next, in the step-wise S104, the server 50 prohibits the owner terminal 30 from accessing the camera mounted on the vehicle 10. The camera is at least one of an outside camera included in the recognition sensor 20 and an in-vehicle camera 24.

Then, in a stepping S106, the server 50 prohibits the owner from remotely controlling the vehicles 10. Specifically, for example, the server 50 prohibits the owner from operating the owner terminal 30 to set a new destination in the vehicle 10.

On the other hand, when the vehicle 10 is not in operation as a robot taxi (step S100; No), the server 50 transmits, as "vehicle position information" in the step S108, an accurate present position of the vehicle 10 (for example, refer to FIG. 3B described later) to the owner terminal 30 as compared with that in operation. The case where the vehicle 10 is not in operation as a robot taxi is a case where there is no need or a low necessity that the privacy of the user is taken into consideration.

Next, in the step-wise S110, the server 50 permits the owner terminal 30 to access the camera mounted on the vehicle 10. As a result, the owner can operate the button of the "camera" displayed on the screen 32 of the owner terminal 30 (refer to FIG. 3B) to display the image of the camera on the screen 32.

Then, in step S112, the server 50 allows the owner to remotely control the vehicles 10. Specifically, for example, the server 50 permits the owner to set a new destination in the vehicle 10 by operating the owner terminal 30. Accordingly, the owner can issue an instruction to the vehicle 10 to automatically travel to the destination set by the owner himself/herself. Issuing an instruction to the vehicle 10 is, in other words, remotely controlling the vehicle 10.

For example, the owner who operates the "destination setting" button (refer to FIG. 3B) displayed on the screen 32 of the owner terminal 30 may transmit the button to the vehicle from the owner terminal 30 via the server 50, thereby setting the destination. Alternatively, the destination may be set by being directly transmitted from the owner terminal 30 to the vehicle 10. In addition, after the lending of the vehicle 10 to one user is completed, the owner may wish to further lend the vehicle 10 to another user. In this case, depending on the disembarkation position of the previous user, the vehicle 10 may be located in a place that is inconvenient for further lending (i.e., a new reservation of a robot taxi). According to the process of the step S112, in such cases, by setting the destination, the owner can move the vehicle 10 to a location where further lending is promoted (for example, an urban area where there is a higher need for lending). In addition, when the owner is out, by setting the destination, the owner can call the vehicle 10 under the owner.

Alternatively, the permission of the remote control in step S112 may be that the owner operates the owner terminal 30 to instruct the vehicle 10 to end the business of the vehicle 10 as a robot taxi. The instruction to end the business may be directly transmitted from the owner terminal 30 to the vehicle 10 or may be transmitted to the vehicle via the server 50. After the vehicle 10 receives the instruction to end the business, the vehicle 10 does not accept a new reservation for the robot taxi. Vehicle 10 automatically travels back to the bottom of the owner (more specifically, the parking lot of the owner's home or the rental warehouse).

2-2. Handling Owner Terminals

In the owner terminal 30, the process of the steps S200 to S204 is executed. In S200 of steps, the owner terminal 30 (processor) determines whether or not the vehicle 10 is operating as a robot taxi. Specifically, for example, the owner terminal 30 receives the determination result of the step S100 from the server 50, and performs the determination of the step S200 by using the received determination result.

FIG. 3A is a diagram illustrating an example of the screen 32 of the owner terminal 30 illustrated in FIG. 1. FIG. 3B is a diagram illustrating another example of the screen 32 of the owner terminal 30 illustrated in FIG. 1. By operating the owner terminal 30 and accessing the server 50, the owner can receive information represented by the screen 32 shown in FIGS. 3A and 3B from the server 50. On the screen 32, for example, information indicating the operation status of the robot taxi, information related to the current position of the vehicle 10, and information indicating the current position on a map are displayed. Of these three pieces of information, the second and third pieces of information correspond to the "vehicle position information" received from the server 50 by the owner terminal 30. On the screen 32, for example, a "camera" button for accessing the camera of the vehicle 10 and a "destination setting" button for setting the destination are displayed.

The owner terminal 30 switches the display format of the "vehicle position information" on the screen 32 in accordance with the determination result of the step S200. That is, the display format of the "vehicle position information" on the screen 32 is switched according to whether or not the vehicle 10 is operating as a robot taxi.

Specifically, when the vehicle 10 is operating as a robot taxi (S200; Yes in steps), the owner terminal 30 displays the "vehicle position information" on the screen 32 in the first display format in the step S202. FIG. 3A shows an exemplary display according to this first display format. On the screen 32 shown in FIG. 3A, it is displayed that the vehicle is "in operation" as a robot taxi. On the screen 32, an approximate distance "to 100 km (within 100 km)" which is an exemplary distance Dv received from the server 50 is displayed as information regarding the present position of the vehicle 10. Instead of the distance Dv, information indicating the area Av may be displayed on the screen. Further, since the vehicle is operating as a robot taxi, a message indicating that the display of the current position on the map (that is, the display of the accurate vehicle position information) is not possible is displayed on the screen 32. When the vehicle 10 is operating as a robot taxi, access to the camera and destination setting are not permitted by the server 50. Therefore, in the screen 32 shown in FIG. 3A, the buttons of "camera" and "destination setting" are grayed out and are not available.

On the other hand, when the vehicle 10 is not operating as a robot taxi (S200; No in steps), the owner terminal 30 displays the "vehicle position information" on the screen 32 in the second display format in the step S204. FIG. 3B shows another exemplary display according to this second display format. On the screen 32 shown in FIG. 3B, the operation status of the robot taxi indicates that the robot taxi is "waiting for reservation". In addition, on the screen 32, information on the area Av (for example, Susono City) as information on the current position of the vehicle 10 and information indicating the current position of the vehicle 10 on the map are displayed. That is, accurate vehicle position information received from the server 50 is displayed on the screen 32.

As described above, the first display format, which is the display format in operation, displays approximate (in other words, coarse) "vehicle position information", whereas the second display format, which is the display format in non-operation, displays accurate "vehicle position information" to the extent that the current position of the vehicle can be specified.

3. Effect

As described above, according to the present embodiment, when the vehicle is operating as a robot taxi, the server 50 transmits the distance Dv from the present position of the owner to the vehicle 10 as the vehicle position information to the owner terminal 30. The distance Dv or the above-described area Av is not accurate position information to the extent that the present position of the vehicles 10 can be specified, but is approximate position information. Then, the owner terminal 30 displays the approximate position information on the screen 32 (first display format). According to such a configuration, it is possible to satisfy the request of the owner who wants to confirm the state of the vehicle 10 being lent out while the privacy of the user of the robot taxi is taken into consideration (in other words, the anxiety of the owner is reduced).

Further, as described above, the server 50 may determine that the vehicle 10 is operating as a robot taxi after the vehicle 10 is separated from the departure point P1 of the vehicle 10 by the first predetermined distance D1 when the vehicle 10 is heading toward the user. As a result, even in a period in which the vehicle 10 is automatically traveling toward the user, it is possible to restrict the vehicle position information transmitted to the owner terminal 30 to the approximate position information and to give consideration to the privacy of the user. In other words, the vehicle position information transmitted to the owner terminal 30 is the vehicle position information displayed on the screen 32 of the owner terminal 30. Then, the limit is released from the departure point P1 within the first predetermined distance D1 (e.g., the vicinity of the owner's home). The area within the first predetermined distance D1 from the departure point P1 is, in other words, an area in which it is not necessary to pay attention to the privacy of the user. As a result, the owner can more reliably watch the vehicle 10 in the area than in the case where the restriction is not released.

Further, according to the present embodiment, when the vehicle 10 leaving under the owner is operating as a robot taxi, access of the owner terminal 30 to the camera mounted on the vehicle 10 is prohibited, and when the vehicle is not operating, access to the camera is permitted. This makes it possible to more effectively monitor the vehicle 10 by the owner when there is no or low necessity of considering the privacy of the user.

4. Another Example of Processing after Getting Off

Figure 4:
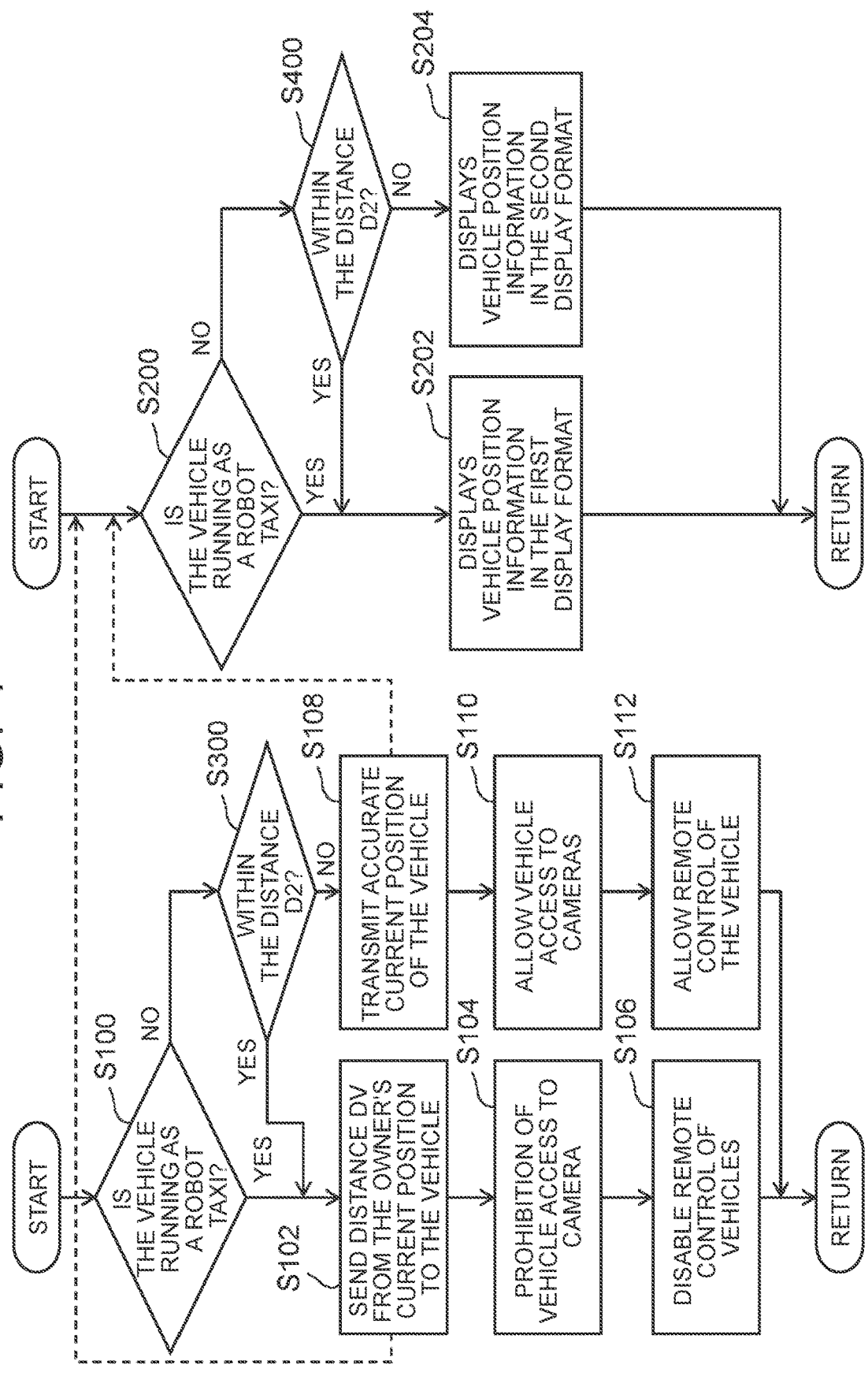
FIG. 4 is a flowchart illustrating an example of processing executed in the vehicle management system according to the modification of the embodiment.

The "vehicle position information" transmitted from the server 50 to the owner terminal 30 after the vehicle 10 is no longer in operation as a robot taxi as the user gets down from the vehicle 10 may be restricted as follows. FIG. 4 is a flowchart illustrating an example of processing executed in the vehicle management system according to the modification of the embodiment.

In FIG. 4, when the vehicle 10 is no longer in operation in step S100, the server 50 determines, in step S300, whether the vehicle 10 is located within the second predetermined distance D2 from the user's getting-off point P2. The second predetermined distance D2 is a predetermined distance for specifying a surrounding area of the getting-off point P2, and is, for example, a 500 m. The second predetermined distance D2 may be a linear distance from the getting-off point P2. The second predetermined distance D2 may be a distance (travel distance) along the travel route of the vehicle 10 from the getting-off point P2. The second predetermined distance D2 may be the same as or different from the first predetermined distance D1 described above.

When the vehicle 10 is located within the second predetermined distance D2 from the getting-off point P2 in step S300, that is, until the vehicle 10 is separated from the getting-off point P2 of the user by the second predetermined distance D2, the process proceeds to step S102. On the other hand, when the vehicle 10 is separated from the getting-off point P2 by the second predetermined distance D2 or more in the step S300, the process proceeds to the step S108.

As in the process illustrated in FIG. 4, the server 50 may prohibit accurate vehicle position information from being transmitted to the owner terminal 30 as compared with the vehicle position data being in operation until the vehicle 10 is separated from the user's getting-off point P2 by the second predetermined distance D2. Further, according to the process illustrated in FIG. 4, the server 50 is prohibited from accessing the camera of the vehicle by the owner terminal 30 until the vehicle 10 is separated from the user's getting-off point P2 by the second predetermined distance D2, and is also prohibited from remotely controlling the vehicle 10 by operating the owner terminal 30.

Further, in FIG. 4, when the vehicle 10 is not in operation in step S200, the owner terminal 30 determines, in step S400, whether the vehicle 10 is located within the second predetermined distance D2 from the user's getting-off point P2. Specifically, the owner terminal 30 receives, for example, the determination result of the step S300 from the server 50. The owner terminal 30 uses the determination received by the owner terminal 30 to determine S400 of steps.

When the vehicle 10 is located within the second predetermined distance D2 from the getting-off point P2 in step S400, that is, until the vehicle 10 is separated from the getting-off point P2 of the user by the second predetermined distance D2, the process proceeds to step S202. On the other hand, when the vehicle 10 is separated from the getting-off point P2 by the second predetermined distance D2 or more in the step S400, the process proceeds to the step S204. According to such a process, even after the vehicle 10 is no longer in operation as a robot taxi, it is prohibited to display the accurate vehicle position information (that is, the position information in the second display format) on the screen 32 as compared with the vehicle position information in operation until the vehicle 10 is separated from the user's getting-off point P2 by the second predetermined distance D2.

The process illustrated in FIG. 4 described above also takes into account the time from when the user gets off the vehicle 10 until when the vehicle 10 leaves the surroundings of the user's getting-off point P2. Accordingly, it is possible to satisfy the owner's request to check the state of the vehicle 10 being lent while further giving consideration to the privacy of the user of the robot taxi.

What is claimed is:

1. A vehicle management system, comprising:
a vehicle management server that manages a vehicle rented from an owner to a user as a robot taxi; and
a communication terminal operated by the owner of the vehicle rented to the user as the robot taxi,
wherein the vehicle management server includes processing circuitry configured to:
determine that the vehicle is in operation as the robot taxi in response to the vehicle being separated from a departure point of the vehicle by a first predetermined distance as the vehicle travels toward the user, wherein the first predetermined distance is a travel distance of 500 meters;
in response to determining that the vehicle is in operation as the robot taxi, transmit vehicle position information to a communication terminal of the owner, the vehicle position information being a distance from a current position of the owner to the vehicle or an area where the vehicle is currently positioned;
in response to determining that the vehicle is in operation as the robot taxi, prohibit access of the communication terminal to a camera mounted on the vehicle by disabling a user interface for the camera on the communication terminal; and
in response to determining that the vehicle is no longer in operation as the robot taxi, permit the access of the communication terminal to the camera by enabling the user interface for the camera;
wherein the communication terminal includes processing circuitry configured to:
when the vehicle is in operation as the robot taxi:
display the vehicle position information on the vehicle on a screen in a first display format including a notification that displaying accurate vehicle position information on the vehicle is not possible while the vehicle is in operation as the robot taxi; and
prohibit access of the communication terminal to the camera mounted on the vehicle by disabling the user interface for the camera on the communication terminal;
when the vehicle is not in operation as the robot taxi:
display the vehicle position information on the screen in a second display format different from the first display format, wherein the second display format includes a map showing a position of the vehicle; and
permit the access of the communication terminal to the camera by enabling the user interface for the camera.

2. The vehicle management system according to claim 1, wherein the vehicle management server prohibits accurate vehicle position information from being transmitted to the communication terminal until the vehicle is no longer in operation as the robot taxi and is separated from a point at which the user gets off the vehicle by a second predetermined distance.

* * * * *